United States Patent

Sobieski et al.

[19]

[11] Patent Number: 6,135,528
[45] Date of Patent: Oct. 24, 2000

[54] COMBINED STORAGE COMPARTMENT AND GARAGE DOOR OPENING TRANSMITTER STORAGE AND ACTUATING COMPARTMENT

[75] Inventors: Eugene J. Sobieski; Mark L. Robinson, both of Holland; Brian R. Dexter, Grand Haven, all of Mich.

[73] Assignee: Prince Corporation, Holland, Mich.

[21] Appl. No.: 09/175,794

[22] Filed: Oct. 20, 1998

[51] Int. Cl.[7] .................................................. B60N 7/00
[52] U.S. Cl. .......................... 296/37.7; 296/37.8; 224/311
[58] Field of Search ........................... 296/37.7, 37.8, 296/37.1; 224/311, 282; 200/61.62

[56] References Cited

U.S. PATENT DOCUMENTS

| 4,469,365 | 9/1984 | Marcus et al. . |
| 4,595,228 | 6/1986 | Chu . |
| 4,783,110 | 11/1988 | Beukema et al. ..................... 296/37.7 |
| 4,809,897 | 3/1989 | Wright, Jr. .............................. 224/282 |
| 4,867,498 | 9/1989 | Delphia et al. . |
| 5,064,974 | 11/1991 | Vigneau et al. ..................... 200/61.62 |
| 5,388,880 | 2/1995 | Kianane ................................ 296/37.7 |
| 5,522,638 | 6/1996 | Falcoff et al. ........................ 296/37.8 |
| 5,713,623 | 2/1998 | Mattingly .............................. 296/37.7 |
| 5,887,929 | 3/1999 | Miller et al. ......................... 296/37.8 |
| 6,003,925 | 12/1999 | Litke et al. ........................... 296/37.8 |

*Primary Examiner*—Dennis H. Pedder
*Assistant Examiner*—Patricia Engle
*Attorney, Agent, or Firm*—Harness, Dickey & Pierce, P.L.C.

[57] ABSTRACT

A storage compartment includes spaced-apart storage areas with a first area capable of holding a remote garage door opening transmitter and covered by a movable panel with a pocket facing the inside of the storage compartment. When the panel is moved from a closed position to an open position, small items such as sunglasses can be removed from the pocket. When closed, the panel can be moved to a third position actuating the garage door remote transmitter.

17 Claims, 3 Drawing Sheets

COMBINED STORAGE COMPARTMENT AND GARAGE DOOR OPENING TRANSMITTER STORAGE AND ACTUATING COMPARTMENT

BACKGROUND OF THE INVENTION

The present invention relates to a vehicle accessory for storage and actuation of a garage door opening transmitter providing the dual function of additional storage.

Electrically operated garage doors and associated remote transmitters are in universal use. The remote transmitter typically is a portable, battery-powered unit which is stored in the home owner's vehicle for selectively transmitting t signal to the garage door actuating mechanism. Frequently, these remote transmitters are clipped to vehicle visors or in some cases removably mounted to the instrument panel or simply placed in an accessory tray in an armrest console or the like.

Difficulty with such mounting arrangements has been solved by the provision of garage door opening storage compartments in overhead consoles as disclosed in U.S. Pat. No. 4,595,228, in which such transmitters are fixedly attached to the floor of an overhead storage compartment and a movable panel encloses the storage compartment and can be depressed for actuating the now hidden and safely stored remote transmitter.

Other storage compartments, typically mounted in an overhead console, have also been provided in vehicles for small items, such as sunglasses and the like. U.S. Pat. No. 4,469,365 discloses one such array of storage bins mounted to an overhead console of a vehicle. Smaller consoles typically will include t single sunglass storage compartment typically located near the rearview mirror area of it vehicle in a console which may also include overhead lights and electronic devices, such as an electronic compass. Some larger vehicles incorporate a garage door transmitter storage compartment and a separate sunglass storage compartment, however, such vehicles, such as sport utility vehicles, are relatively large and can accommodate consoles having room for multiple storage compartments. With the down-sizing of many vehicles, providing the capability of storing the remote transmitter and actuating it easily externally through the storage compartment and providing a separate sunglass storage is difficult in view of the relatively small space available for consoles which occupy significant overhead space in a vehicle.

There exists a need, therefore, for a system in which the space problem for multiple storage compartments can be solved while also providing the convenience of a garage door opening transmitter control and storage compartment.

SUMMARY OF THE INVENTION

The storage compartment of the present invention solves the problem with relatively small consoles not being capable of providing both sunglass and garage door remote transmitter storage compartments by providing a single storage compartment having spaced-apart storage areas with a first area capable of holding a remote garage door opening transmitter and covered by a movable panel having an actuator which engages the actuator switch on the garage door opening transmitter and closes the compartment. The panel integrally includes, in a preferred embodiment of the invention, a pocket facing the inside of the storage compartment such that when the panel or door is moved from a closed position to an open position, small items such as sunglasses can be removed from the pocket on the inner surface of the pivotally mounted panel. The panel, when closed, therefore, can be moved between a pivoted open position providing access to the items stored within the pocket in the inside of the panel, a closed position enclosing the storage compartment, and a third position actuating the garage door remote transmitter. For such purpose, the panel may integrally or separately include a deflectable section moveable independently of the panel. The advantage of such a system, therefore, provides a relatively small overhead console which provides a single storage compartment with the capability of storing and actuating a remote transmitter control unit as well as storing relatively small items such as sunglasses.

These and other features, objects and advantages of the present invention will become apparent upon reading the following description thereof together with reference to the accompanying drawings.

DETAILED DESCRIPTION OF THE PREFERRED EMBODIMENT

Figure 1:
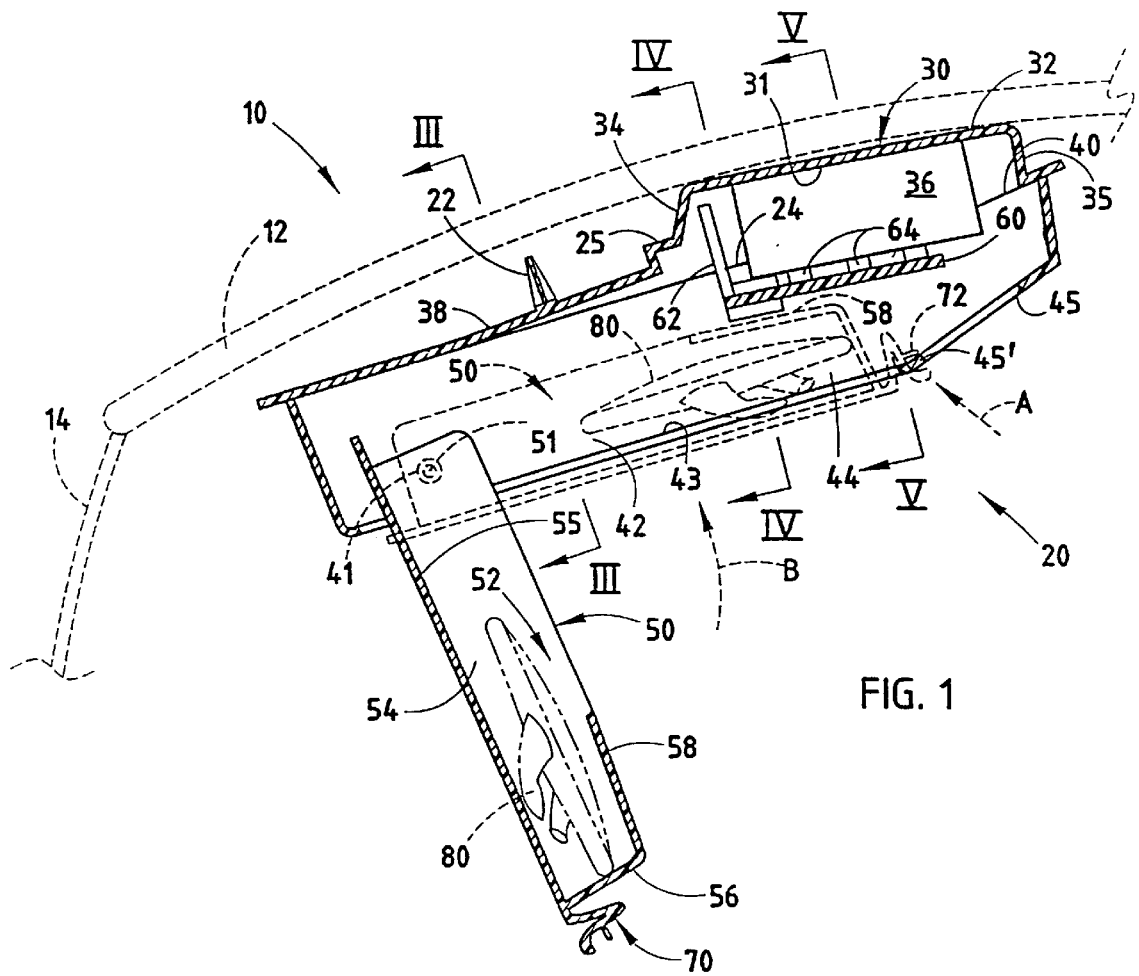
FIG. 1 is a fragmentary vertical cross-sectional view, partly in phantom form, of a vehicle having an overhead console with a storage compartment embodying the present invention.
Figure 2:
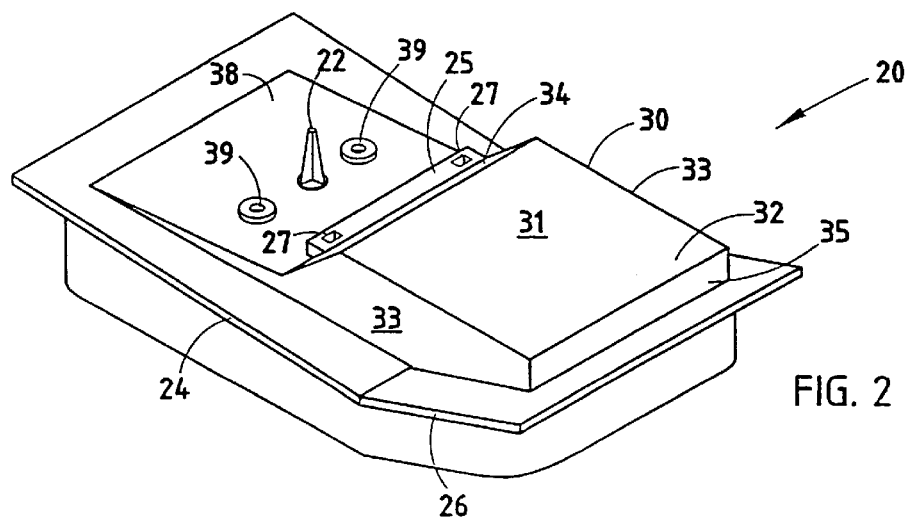
FIG. 2 is a top perspective view of the console shown in FIG. 1.
Figure 6:
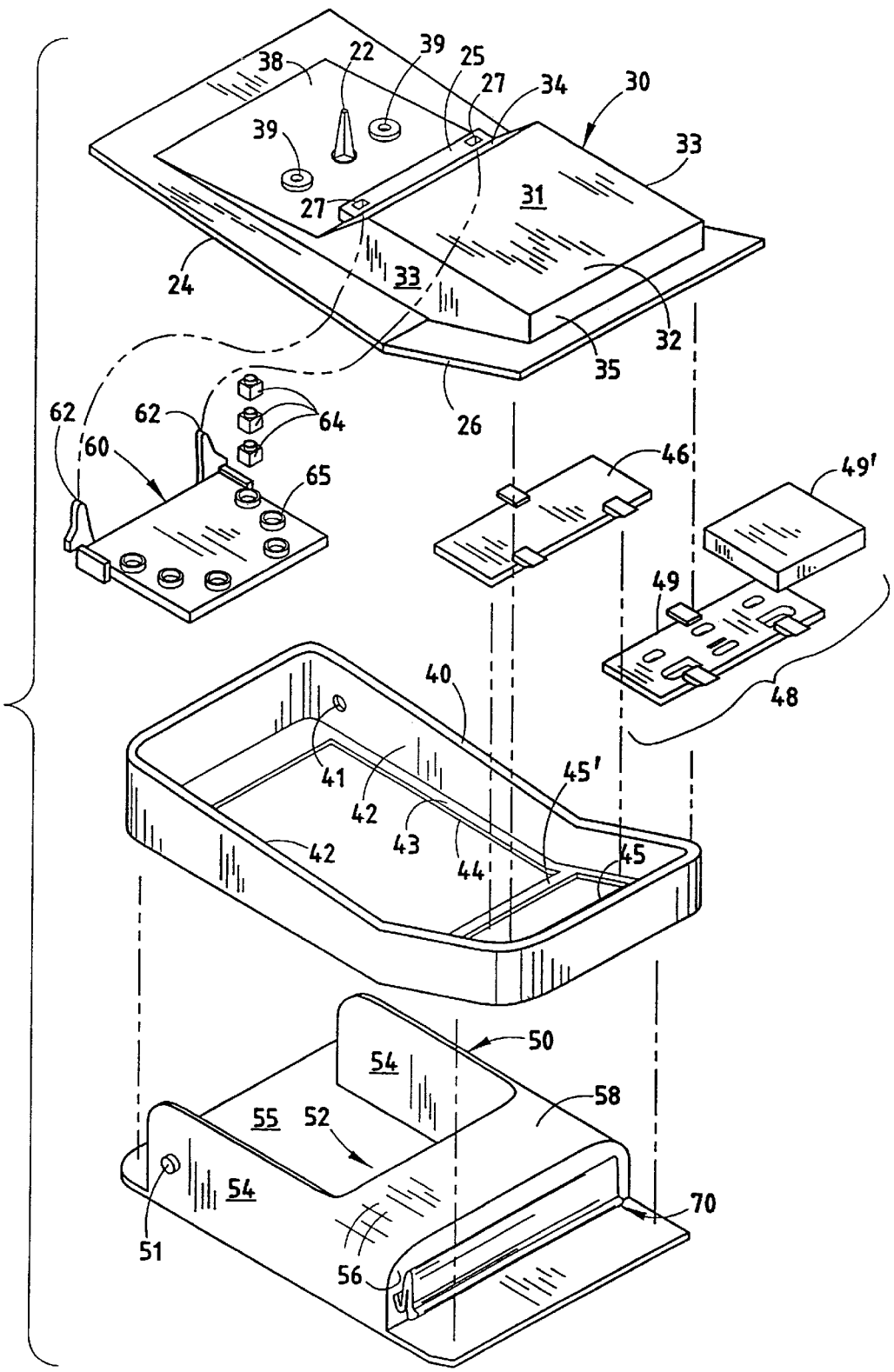
FIG. 6 is an exploded perspective view of the console shown in FIGS. 1–5.

Referring initially to FIGS. 1 and 6, there is shown a vehicle 10 having a roof 12 with typical sheet metal support beams to which an overhead console and storage compartment 20 of the present invention is mounted. Typically, the console 20 is mounted to the roof 12 adjacent and/or near the front windshield 14 of the vehicle. The overhead console and storage compartment 20 comprises three major components, as best seen in FIG. 6, a mounting bracket or housing 30, a trim housing 40 and a combined cover panel or door and storage bin 50. The mounting bracket is an integrally molded member made of a polymeric material, such as ABS, polycarbonate or the like, suitable for the headliner environment of a vehicle. The mounting bracket 30 includes a generally rectangular storage compartment 32 defined by a floor 31, sidewalls 33, a front wall 34, and a rear wall 35 at the rear-facing end of bracket 30. The generally rectangular storage compartment 32 receives a remote control transmitter 36 therein which is held to the inner surface of floor 31 by means of hook-and-loop fasteners, such as Velcro®, double-backed tape or the like, as disclosed in U.S. Pat. No. 4,595,228, the disclosure of which is incorporated herein by reference. On the outer surface of floor 31 there may be provided a pad for providing rattle-free mounting of the console 20 to the vehicle roof 12. Bracket 30 further includes a mounting platform 38 having a pair of apertures 39 for receiving fastening screws therethrough. Mounting plate 38 may also include a locator pin 22 for aligning the mounting bracket with the vehicle sheet metal roof for assembly. Plate 38 and storage compartment 32 are integrally molded is part of a generally rectangular member having a forward section 24 and a rearward section 26, as best seen in FIG. 6. Front wall 34 integrally includes a ledge 25 with spaced apertures 27 therein for receiving locking projections 62 of a garage door actuating plate 60 as described in greater detail below.

Covering mounting bracket 30 is a decorative housing 40 having a generally rectangular shape with a pair of sidewalls 42, a floor 43 having an opening 44 for receiving panel 50, a rear-facing opening 45 which can be filled with a blank cover 46 (FIG. 6) or an electronic module 48 which may include a digital display 49 and circuit board 49'. Housing 40 snap-fits or otherwise is attached to mounting bracket 30 in a conventional manner with the edges of platforms 24 and 26 fitting within the concave housing 40. Housing 40 and bracket 30 may be ultrasonically welded together, snap-fit together, bonded by an adhesive or other structure to mount the two members together.

Figure 3:
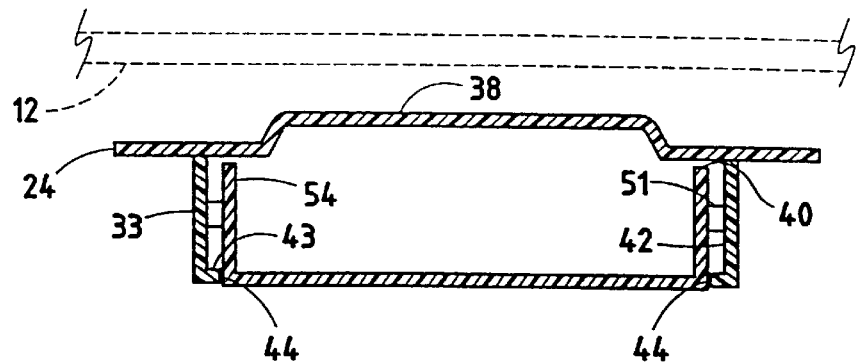
FIG. 3 is a cross-sectional view of the storage compartment, taken along section lines III—III of FIG. 1.
Figure 4:
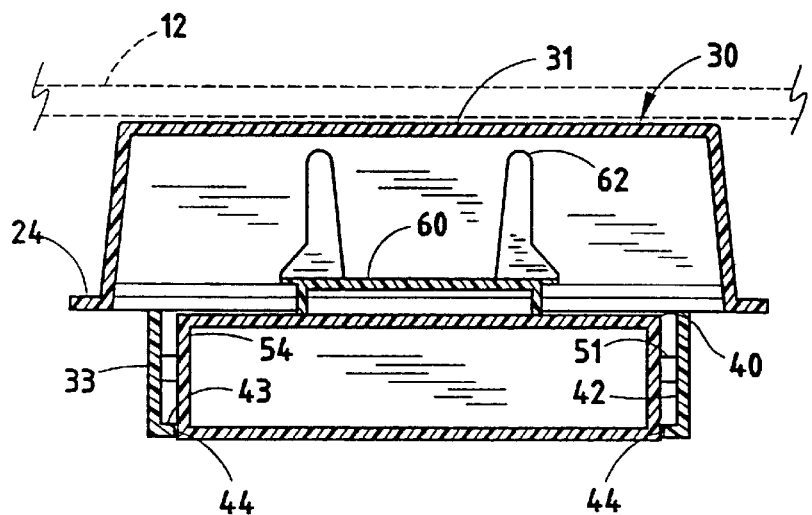
FIG. 4 is a cross-sectional view of the console taken along section lines IV—IV of FIG. 1.
Figure 5:
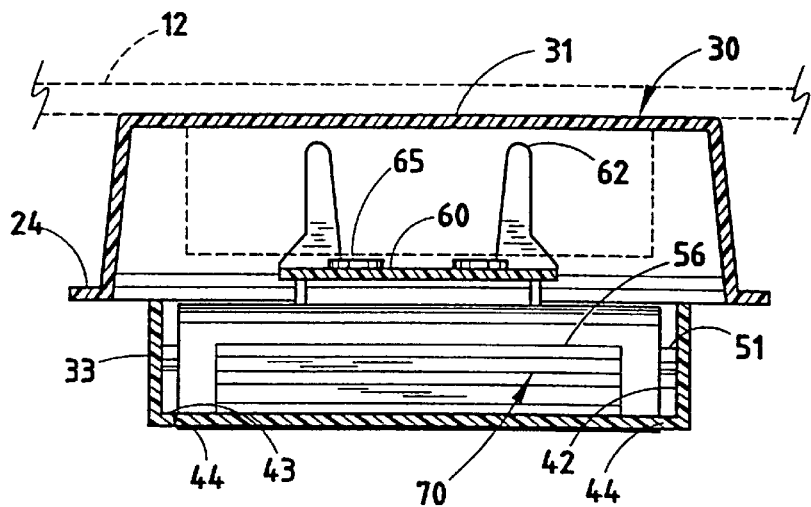
FIG. 5 is a cross-sectional view of the console taken along section lines V—V of FIG. 1.

Panel 50 includes a pair of pivot pins 51 extending from sidewalls 54 and which engage sockets 41 in the sidewalls 42 of housing 40 allowing the panel to pivot between a closed position, shown in FIG. 1, to an open position, shown in phantom form in FIG. 1. This panel provides access to the storage pocket 52 defined by the sidewalls 54 of panel 50, floor 55 and end wall 56 with an integral lip 58, as best seen in FIGS. 1 and 6. The cover 50 includes an integral resilient catch 70 defined by a generally V-shaped member, as best seen in FIG. 1, which can be depressed inwardly in the direction indicated by arrow A in FIG. 1 with the locking tip 72 engaging the inner upper surface of 45' of housing 40 for latching the door in a closed position. Latch 70 allows the cover to be pressed upwardly in the direction indicated by arrow B in FIG. 1 such that the outer surface 58 engages the actuator plate 60, deflecting the resilient polymeric actuator such that the actuator buttons 64 (selectively placed in sockets 65 as required for a given garage door opening transmitter) engage the actuator button of garage door remote transmitter 36 as described also in U.S. Pat. No. 4,595,228. Thus, the panel 50 can move between an open position as shown in phantom form in FIG. 1, a closed position as shown in solid lines in FIG. 1, and an upwardly deflected position deflecting actuator panel 60 for actuating the garage door remote control transmitter 36. The garage door actuator panel 60 substantially covers the garage door opening transmitter when panel 50 is opened, allowing for the storage of small items, such as sunglasses 80 or the like, therein as seen in FIG. 1. In some embodiments, it may be desirable to provide a rotary damper to the pivot connection between panel 50 and housing 40 in a conventional manner. The details of the mounting bracket housing 30, trim housing 40, and panel 50 are seen in the cross-sectional views of FIGS. 3–5. The trim housing 40, panel 50 and actuator plate 60 are also integrally molded of a resilient polymeric material, such as ABS, polypropylene, polycarbonate or the like.

Thus, with the storage compartment of the present invention, a storage compartment is provided for a remote control transmitter and a drop down storage bin forming a cover panel which also is employed for the actuation of the remote control transmitter. The two storage areas of the storage compartment are spaced apart vertically, as seen in FIG. 1, allowing for the compact storage of both a remote control transmitter and items such as sunglasses or the like. Panel 50, although movable in three positions, may include a deflectable section either as part of the floor 55 of panel 50 or a separate actuator for engaging plate 60 which engages the remote control transmitter 36 for its actuation. Such structure is equivalent and used in a variety of commercial garage door opening transmitter compartments. These and other modifications to the preferred embodiment of the invention as described herein can be made without departing from the spirit or scope of the invention as defined by the appended claims.

The invention claimed is:

1. A vehicle overhead console comprising:

a mounting bracket defining a storage compartment for receiving a remote control transmitter therein;

a housing mounted to said mounting bracket for enclosing said mounting bracket; and a panel pivotally mounted to one of said housing and said mounting bracket and defining a storage pocket spaced from said storage compartment of said mounting bracket for providing additional storage, wherein a portion of said storage compartment is vertically displaced relative to a portion of said storage pocket.

2. The console as defined in claim 1 wherein said housing includes a rearward facing opening for receiving an electronic module.

3. The console as defined in claim 1 and further including a resilient polymeric actuator plate mounted to said mounting bracket and engageable by said panel for deflection upon an upward force being applied to said panel for actuating a remote control transmitter contained in said storage compartment.

4. The console as defined in claim 3 wherein said panel integrally includes a latch for latching said panel in a closed position and allowing its release for opening to provide access to said storage pocket.

5. A vehicle storage assembly comprising:

a mounting bracket defining a first storage compartment for receiving a remote control transmitter therein;

a housing mounted to said mounting bracket for enclosing said mounting bracket; and a cover panel pivotally mounting to one of said housing and said mounting bracket and defining a second storage compartment spaced from said first storage compartment of said mounting bracket for providing additional storage, said cover panel being operable to actuate said remote control transmitter.

6. The assembly as defined in claim 5 and further including a resilient polymeric actuator panel mounted to said mounting bracket and engageable by said cover panel for deflection upon an upward force being applied to said cover panel for actuating a remote control transmitter contained in said first storage compartment.

7. The assembly as defined in claim 6 wherein said cover panel integrally includes a latch for latching said panel in a closed position and allowing its release for opening to provide access to said second storage compartment.

8. The assembly as defined in claim 7 wherein said first and second storage compartments are vertically displaced.

9. The assembly as defined in claim 8 wherein said housing includes an opening for receiving an electronic module.

10. A multiple section storage compartment for a vehicle comprising:

a housing defining a first storage compartment and a cover pivotally mounted to said housing and including a storage bin integrally formed on a side of said cover facing said housing, said cover movable between a closed position enclosing said first storage compartment and an open position for providing access to said first storage compartment and to said storage bin, wherein a portion of said first storage compartment is vertically displaced relative to a portion of said storage bin.

11. The compartment as defined in claim 10 wherein said cover integrally includes a latch for latching said cover in a closed position and allowing its release for opening to provide access to said storage bin.

12. The compartment as defined in claim 11 wherein said storage compartment and said storage bin are spaced apart in said housing.

13. The compartment as defined in claim 12 wherein said housing includes an opening for receiving an electronic module.

14. The compartment as defined in claim 10 wherein said cover is operable to actuate a remote control transmitter positioned substantially within said first storage compartment.

15. The compartment as defined in claim 14 and further including an actuator panel mounted to said housing and engageable by said cover for deflection upon an upward force being applied to said cover for actuating a remote control transmitter substantially positioned in said first storage compartment.

16. The compartment as defined in claim 15 wherein said actuator panel is made from a resilient polymeric material.

17. The compartment as defined in claim 15 further including at least one actuator button positioned on said actuator panel, said actuator button being operable to actuate said remote control transmitter substantially positioned in said first storage compartment.

* * * * *